United States Patent
Hoshide et al.

(10) Patent No.: US 12,479,607 B2
(45) Date of Patent: Nov. 25, 2025

(54) FLYING ROBOT

(71) Applicant: THK CO., LTD., Tokyo (JP)

(72) Inventors: Kaoru Hoshide, Tokyo (JP); Masaki Shibuya, Tokyo (JP); Jun Kawasaki, Tokyo (JP); Tomonari Furukawa, Earlysville, VA (US); Abdullah Abdul-Dayem, Toronto (CA)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 18/024,402

(22) PCT Filed: Aug. 19, 2021

(86) PCT No.: PCT/JP2021/030429
§ 371 (c)(1),
(2) Date: Mar. 2, 2023

(87) PCT Pub. No.: WO2022/050070
PCT Pub. Date: Mar. 10, 2022

(65) Prior Publication Data
US 2023/0312144 A1  Oct. 5, 2023

Related U.S. Application Data

(60) Provisional application No. 63/074,149, filed on Sep. 3, 2020.

(51) Int. Cl.
| | | |
|---|---|---|
| *B64U 60/50* | (2023.01) | |
| *B60F 5/02* | (2006.01) | |
| *B64D 45/00* | (2006.01) | |
| *B64U 10/14* | (2023.01) | |
| *B64U 10/70* | (2023.01) | |
| *B64U 30/20* | (2023.01) | |

(52) U.S. Cl.
CPC ............. *B64U 10/70* (2023.01); *B60F 5/02* (2013.01); *B64D 45/00* (2013.01); *B64U 10/14* (2023.01); *B64U 30/20* (2023.01); *B64U 60/50* (2023.01)

(58) Field of Classification Search
CPC ........ B64U 60/50; B64U 10/14; B64U 10/70; B64U 10/13; B64U 30/20; B64U 60/20;
(Continued)

(56) References Cited

U.S. PATENT DOCUMENTS 11,001,380 B2 * 5/2021 Nahuel-Andrejuk ........................ G05D 1/101
11,320,840 B2 * 5/2022 Shimizu ............... G05D 1/0669
(Continued)

FOREIGN PATENT DOCUMENTS

| IN | 110834722 A | 2/2020 |
|---|---|---|
| JP | 2015-530318 A | 10/2015 |

(Continued)

OTHER PUBLICATIONS

International Search Report dated Oct. 12, 2021, issued in counterpart International Application No. PCT/JP2021/030429, with English Translation. (4 pages).
(Continued)

*Primary Examiner* — Joshua D Huson
*Assistant Examiner* — Vicente Rodriguez
(74) *Attorney, Agent, or Firm* — WHDA, LLP (57) ABSTRACT

A flying robot includes a body portion, a propulsion portion including a plurality of propulsion units configured to generate propulsion force by driving rotor blades, the plurality of propulsion units being provided at the body portion, a plurality of leg portions configured to support the body portion, each leg portion of the plurality of leg portions including at least one joint and being configured to be able to change a posture of the leg portion, and a controller configured to control the plurality of leg portions when landing on a landing surface from a flying state, and the controller controls part or all of at least one leg portion among the plurality of leg portions to adjust a tilt of the body
(Continued)

portion from when the at least one leg portion comes into contact with the landing surface until when landing on the landing surface is completed.

11 Claims, 7 Drawing Sheets

(58) Field of Classification Search
CPC ........... B64U 60/40; B60F 5/02; B64D 45/00; B64C 2025/325; B64C 25/20; B64C 25/26; B62D 57/032
See application file for complete search history.

(56) References Cited

U.S. PATENT DOCUMENTS

| 2002/0060267 | A1* | 5/2002 | Yavnai ................... B64U 60/40 180/7.4 |
| 2014/0249702 | A1* | 9/2014 | Pflug ....................... B64C 25/52 701/16 |
| 2016/0272308 | A1* | 9/2016 | Gentry ...................... B64D 1/02 |
| 2017/0123420 | A1* | 5/2017 | Shi ........................ G05D 1/0055 |
| 2017/0274988 | A1* | 9/2017 | Nguyen ................. B64U 60/20 |
| 2018/0312023 | A1* | 11/2018 | Braithwaite .............. B60F 5/02 |
| 2019/0127052 | A1* | 5/2019 | Chen ...................... B64C 39/024 |
| 2020/0255140 | A1 | 8/2020 | Nahuel-Andrejuk et al. |
| 2022/0176568 | A1* | 6/2022 | Narita ................... B25J 13/089 |

FOREIGN PATENT DOCUMENTS

| JP | 2018-510805 A | 4/2018 |
| JP | 2019-206333 A | 12/2019 |

OTHER PUBLICATIONS

Office Action dated Jul. 11, 2025, issued in counterpart CN Application No. 202180054022.4, with English translation. (16 pages).

* cited by examiner

FLYING ROBOT

TECHNICAL FIELD

The present invention relates to a flying robot.

BACKGROUND ART

In recent years, unmanned aerial vehicles have been utilized in various applications, and development of unmanned aerial vehicles has been actively underway. As unmanned aerial vehicles, radio-controlled unmanned helicopters or so-called drones are used. Here, a technique of horizontally supporting a helicopter by adjusting a length of a landing support when the helicopter is landed on a slope, is known (see, for example, Patent document 1). Further, a technique of horizontally supporting a body portion of an aerial vehicle by connecting landing legs to the body portion so that the landing legs can be independently displaced when the aerial vehicle lands on an irregular ground, is known (see, for example, Patent document 2).

CITATION LIST

Patent document
Patent document 1: Japanese Patent Laid-Open No. 2015-530318
Patent document 2: Japanese Patent Laid-Open No. 2019-206333

SUMMARY OF THE INVENTION

Problems to be Solved by the Invention

While landing on a sloping plane is assumed in related art, landing on a place with irregularities is not assumed. There is therefore a possibility that an aerial vehicle in related art may lose balance when the aerial vehicle lands on a place with irregularities.

The present invention has been made in view of various circumstances as described above, and an object thereof is to enable more stable landing.

Means for Solving the Problems

One aspect of the present invention is a flying robot including a body portion, a propulsion portion including a plurality of propulsion units configured to generate propulsion force by driving rotor blades, the plurality of propulsion units being provided at the body portion, a plurality of leg portions configured to support the body portion, each leg portion of the plurality of leg portions including at least one joint and being configured to be able to change a posture of the leg portion, and a controller configured to control the plurality of leg portions when landing on a landing surface from a flying state, in which the controller controls part or all of at least one leg portion among the plurality of leg portions to adjust a tilt of the body portion from when the at least one leg portion comes into contact with the landing surface until when landing on the landing surface is completed.

Effects of the Invention

According to the present invention, it is possible to achieve more stable landing.

MODE FOR CARRYING OUT THE INVENTION

A flying robot that is one aspect of the present invention includes a body portion, a propulsion portion, leg portions and a controller. The propulsion portion includes a plurality of propulsion units. The plurality of propulsion units can, for example, individually change propulsion force by individually changing rotation speed of rotor blades and can thereby change a posture of the flying robot. For example, it is possible to move the flying robot in a desired direction while tilting the flying robot and perform posture control by providing a difference in propulsion force of the plurality of propulsion units. Further, the flying robot can move in a vertical direction by changing propulsion force of the plurality of propulsion units at the same time.

Tip portions of the plurality of leg portions are portions that come into contact with a landing surface when the flying robot lands. Here, in a case where the flying robot lands on an irregular ground, all of the plurality of leg portions do not always come into contact with the landing surface at the same time. Further, for example, if the landing surface has irregularities and one leg portion comes into contact with the landing surface first, there is a possibility that the flying robot may tilt centering around this contact portion. In other words, if one leg portion comes into contact with the landing surface, the flying robot tilts by the leg portion receiving reaction force from the landing surface. In contrast, the leg portion of the present disclosure includes at least one joint. Here, when a leg portion comes into contact with the landing surface and force is applied to the leg portion, a distance between a tip portion and a base end portion of the leg portion in a vertical direction can be changed by moving the joint of the leg portion. This can reduce reaction force to be received from the landing surface. Further, by controlling part or all of at least one leg portion among the plurality of leg portions to adjust a tilt of the body portion from when the at least one leg portion comes into contact with the landing surface until when landing on the landing surface is completed, it is possible to prevent balance from being lost at the time of landing. Note that completion of landing refers to, for example, a state where propulsion force of the propulsion portion can be stopped. A state until landing is completed may be referred to as a flying state. Note that the plurality of leg portions may be, for example, configured so as to allow the flying robot to walk after the flying robot lands. In other words, the plurality of leg portions may have a function as legs when landing and a function as legs when the flying robot walks after landing. In this manner, the legs when landing can be also used as legs when the flying robot walks after landing. However, the function of walking is not essential for the plurality of leg portions.

Further, in a process of causing the body portion to descend by the propulsion portion for landing on the landing surface from the flying state, the controller may execute first processing of recognizing, as a first leg portion, a leg portion that comes into contact with the landing surface first among the plurality of leg portions and second processing of causing the body portion to further descend and causing another leg portion to come into contact with the landing surface while moving the joint of the first leg portion while keeping contact between the first leg portion and the landing surface.

The body portion continues to descend also after the first leg portion comes into contact with the landing surface. Thus, the process of causing the body portion to descend includes a period during which the body portion descends after the leg portion comes into contact with the landing surface. In the first processing, the leg portion that comes into contact with the landing surface first is recognized as the first leg portion. Whether or not each leg portion comes into contact with the landing surface can be determined, for example, on the basis of change of an output value of a pressure sensor provided at a tip portion of the leg portion. Further, as another method, force to be applied to a joint of each leg portion may be detected. In this detection, change of a current flowing through an actuator provided at the joint may be utilized. Further, as another method, for example, the first leg portion may be recognized in accordance with a tilt of the body portion. For example, a leg portion whose base end portion is located at the highest when the body portion tilts may be recognized as the first leg portion.

In the second processing, the body portion is caused to further descend while moving the joint of the first leg portion. By moving the joint of the first leg portion, even if the body portion is caused to further descend, reaction force from the landing surface can be reduced, so that it is possible to prevent the body portion from tilting. Further, by causing the body portion to further descend, another leg portion other than the first leg portion can come into contact with the landing surface. In this manner, the second processing makes it possible to cause the other leg portion other than the first leg portion to come into contact with the landing surface while preventing the body portion from tilting.

The controller may cause the body portion to descend while moving the joint of the other leg portion while keeping contact between the other leg portion that comes into contact with the landing surface and the landing surface in the second processing. This can cause other leg portions to come into contact with the landing surface. In this manner, by causing the plurality of leg portions to sequentially come into contact with the landing surface and moving the joints of the leg portions that come into contact with the landing surface, it is possible to cause the plurality of leg portions to come into contact with the landing surface without losing a posture of the body portion.

Further, while the second processing is performed by the controller, the propulsion portion may drive the plurality of propulsion units so as to keep the body portion in a horizontal state. In other words, when the leg portions come into contact with the landing surface, by individually changing propulsion force of the plurality of propulsion units while moving the joints, the body portion can be easily made closer to the horizontal state.

Further, the controller may further execute third processing of determining whether or not the body portion can continue to descend so that another leg portion comes into contact with the landing surface on the basis of an angle of the joint of the first leg portion while the second processing is performed. When the body portion is caused to descend while the joint of the first leg portion is moved, if a distance between the other leg portion and the landing surface is long, there can be a case where an upper limit of a range of movement of the joint is reached while the joint of the first leg portion is moved. For example, in a case where the landing surface with which the first leg portion is in contact protrudes or in a case where a hole is open on the landing surface in a downward direction of the other leg portion, the upper limit of the range of movement of the joint of the first leg portion is reached before the other leg portion comes into contact with the landing surface. In this case, if the body portion is caused to further descend, it becomes impossible to reduce reaction force to be received by the first leg portion from the landing surface, so that there is a possibility that the body portion tilts centering around the contact portion of the first leg portion and the landing surface. The controller therefore determines whether or not the body portion can continue to descend. By executing such third processing, whether or not the horizontal state of the body portion can be kept can be determined, so that it is possible to prevent landing in an unstable state.

Further, in a case where it is determined in the third processing that the body portion cannot continue to descend, the propulsion portion may cause the body portion to ascend up to a position at a time of first contact when the first leg portion comes into contact with the landing surface first while the controller returns an angle of the joint of the first leg portion in a state at the time of the first contact while keeping a state where the first leg portion is in contact with the landing surface. In a case where it is determined in the third processing that the body portion cannot continue to descend, there can be a case where the body portion tilts beyond the upper limit of the range of the movement of the joint of the first leg portion. If the propulsion force of the propulsion portion is increased while the body portion is tilted, there is a possibility that an airframe may ascend in a direction tilted from the vertical direction. Further, if there is an obstacle in a direction in which the flying robot ascends, there is a possibility that the airframe may come into contact with the obstacle. Thus, the propulsion portion causes the body portion to ascend up to a position at a time of first contact when the first leg portion comes into contact with the landing surface first while the controller returns the angle of the joint of the first leg portion to a state at the time of the first contact. In the state at the time of the first contact, the joint of the first leg portion is within the range of movement, so that it is possible to keep the body portion in a horizontal state. Further, if the body portion is kept in the horizontal state, even if the propulsion portion increases the propulsion force of the propulsion unit, the flying robot can ascend in the vertical direction, so that, even if there is an obstacle near the flying robot, it is possible to prevent the flying robot from coming into contact with the obstacle. Further, by causing the body portion to ascend while keeping a state where the first leg portion is in contact with the landing surface, it is possible to stabilize the body portion.

Further, a pressure sensor capable of detecting a pressure when each leg portion of the plurality of leg portions comes into contact with the landing surface may be provided at a tip of the leg portion, and the controller may recognize the first leg portion on the basis of whether or not there is output regarding contact from the pressure sensor provided at the first leg portion in the first processing, and the controller may further execute fourth processing of determining that landing on the landing surface of the flying robot is completed when output values of the pressure sensors respectively provided at the plurality of leg portions are in a predetermined correlated state. In other words, if the leg portion comes into contact with the landing surface, output of the pressure sensor provided at the leg portion changes. Thus, in a case where output of the pressure sensor provided at each leg portion changes, it can be determined that the leg portion comes into contact with the landing surface. Also thereafter, if another leg portion comes into contact with the landing surface, output of the pressure sensor provided at the leg portion that comes into contact with the landing surface changes. In this manner, the leg portion that comes into contact with the landing surface can be determined on the basis of whether or not there is output of the pressure sensor provided at each leg portion. Then, in a case where landing of the flying robot is completed, output of the pressure sensor provided at each leg portion becomes output in accordance with completion of landing. For example, a sum of pressures detected by the respective pressure sensors can be a value correlated with mass of the flying robot. Thus, the predetermined correlated state refers to a state where it can be determined that landing of the flying robot is completed. The fourth processing may be executed, for example, in view of the propulsion force in an upward direction by the propulsion portion and the mass of the flying robot. In a case where landing is completed, even if the propulsion portion stops generation of the propulsion force by the propulsion unit, tilt of the body portion is prevented.

Further, a detection unit that detects a tilt of the body portion may be further provided, and if the detection unit detects a tilt of the body portion from a horizontal state when the leg portion comes into contact with the landing surface from the flying state in a state where the plurality of leg portions take a predetermined posture, the controller may control the at least one leg portion to make a state of the body portion closer to the horizontal state. The above-described predetermined posture is, for example, a posture that can be taken by the leg portion when the flying robot is in the flying state. If the leg portion comes into contact with the landing surface as described above, the body portion tilts. In a case where this tilt is detected, the controller may control the at least one leg portion. For example, when the body portion tilts, the leg portion whose base end portion is located at the highest is highly likely to be in contact with the landing surface, and thus, the joint of the leg portion may be moved. By controlling the joint in accordance with the tilt of the body portion in this manner, it is possible to prevent the flying robot from losing balance at a time of landing.

Further, the controller may cause the body portion to descend while moving the joint of the leg portion while keeping contact between the leg portion that comes into contact with the landing surface and the landing surface. By causing the body portion to descend while keeping contact between the leg portion that comes into contact with the landing surface and the landing surface, other leg portions can sequentially come into contact with the landing surface.

Further, the controller may further determine whether the body portion can continue to descend on the basis of an angle of the joint of the leg portion. If the joint of the leg portion is moved to make the state of the body portion closer to the horizontal state, there can be a case where the upper limit of the range of movement can be reached. If the body portion is caused to further descend after the upper limit of the range of movement is reached, it can be difficult to make the state of the body portion closer to the horizontal state. In such a case, it can be determined that the body portion cannot continue to descend. If descent of the body portion is stopped by such determination, it is possible to prevent the body portion from tilting.

Further, in a case where the controller determines that the body portion cannot continue to descend, the propulsion portion may cause the body portion to ascend up to a position at a time of first contact when the first leg portion comes into contact with the landing surface first while the controller returns the angle of the joint of the first leg portion to a state at the time of the first contact while keeping the state where the first leg portion is in contact with the landing surface. In this manner, it is possible to prevent the flying robot from ascending in an oblique direction, so that, for example, even in a case where an obstacle exists near the flying robot, it is possible to prevent contact with the obstacle.

Embodiments for implementing the invention will be described below with reference to the drawings. However, dimensions, materials, shapes, relative positions, and the like, of components described in the embodiments do not intend to limit the scope of the invention unless otherwise described. Further, the following embodiments can be combined as far as possible.

First Embodiment

Figure 1:
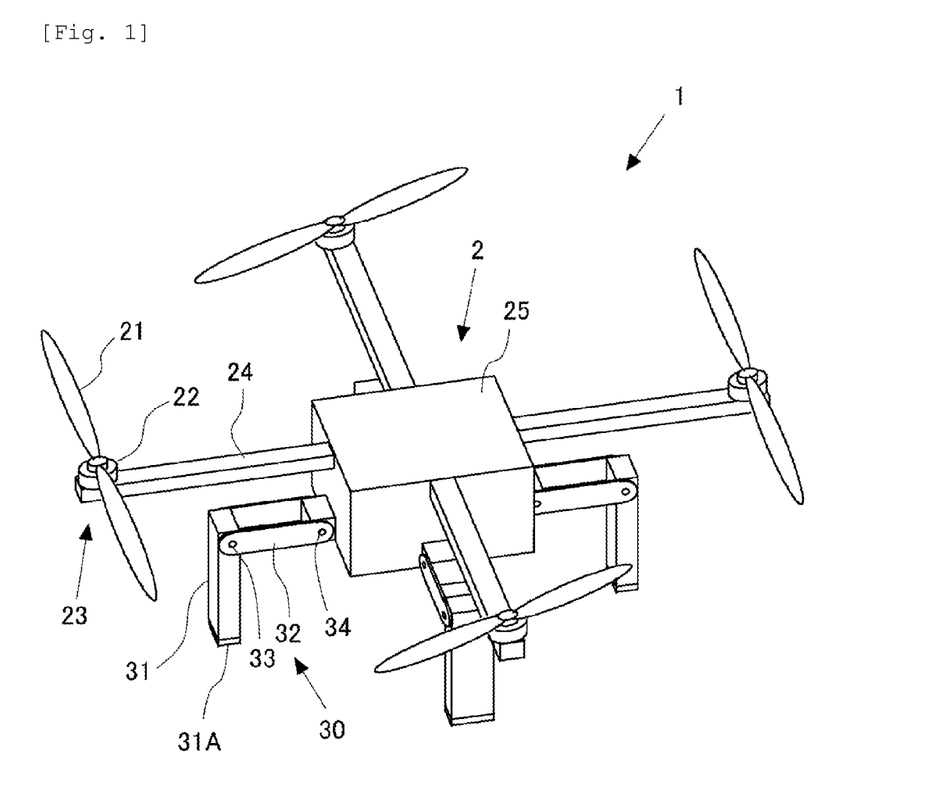
FIG. 1 is a view illustrating an example of a schematic configuration of a flying robot according to an embodiment.

Here, a flying robot 1 according to the present embodiment will be described on the basis of FIG. 1. FIG. 1 is a view illustrating an example of a schematic configuration of the flying robot 1 according to the present embodiment. The flying robot 1 includes a body portion 2. The body portion 2 includes a plurality of propulsion units 23. Note that while in the example illustrated in FIG. 1, four propulsion units 23 are mounted on the body portion 2, the number of the propulsion units 23 is not limited to four if the body portion 2 can fly, and it is only necessary that a plurality of propulsion units 23 be provided. Each of the propulsion units 23 includes a propeller 21 that is a rotor blade, and an actuator 22 for rotationally driving the propeller. While the propulsion units 23 mounted on the body portion 2 are all units of the same type, the actuators 22 can be independently controlled at the respective propulsion units 23. Thus, propulsion force obtained by the respective propulsion units 23 can be controlled as appropriate, so that a flying posture, flying speed, and the like, in the body portion 2 and the flying robot 1 can be controlled as appropriate. Note that flying control of the flying body portion, and the like, by the propulsion units 23 will be described later.

Here, the body portion 2 includes a body 25 at approximately the center, and the propulsion units 23 are provided in a radial manner on a tip side of the body 25 via bridges 24. Four propulsion units 23 are arranged at equal intervals on the circumference centering around the body 25.

Further, four leg portions 30 that support the body portion 2 are connected to the body portion 2. The four leg portions 30 are arranged at equal intervals on the circumference centering around the body 25. Each of the leg portions 30 includes a first link portion 31 whose tip portion comes into contact with the landing surface when landing, a second link portion 32 provided closer to the body 25 than the first link portion 31, a first joint 33 that rotatably connects the first link portion 31 and the second link portion 32, a second joint 34 that rotatably connects the second link portion 32 and the bridge 24, and an actuator (not illustrated) that drives the first joint 33 and the second joint 34. The first joint 33 connects a base end portion of the first link portion 31 and a tip portion of the second link portion 32. The second joint 34 connects a base end portion of the second link portion 32 and the body 25. Rotation directions of these joints are designed so as to rotate at the time of landing on an irregular ground. For example, the first joint 33 and the second joint 34 are designed so as to have rotation axes in a horizontal direction and so that the rotation axis of the first joint 33 is parallel to the rotation axis of the second joint 34 in the same leg portion 30. Note that while four leg portions 30 are provided in the present embodiment, the number of the leg portions 30 is not limited to this and only requires to be equal to or greater than 3. Further, while two joints are provided for one leg portion 30 in the present embodiment, the present invention is not limited to this, and it is only necessary to provide one or more joints.

Further, in the body 25, a battery 28 (see FIG. 2) for supplying drive power to the actuator 22 of each propulsion unit 23 and a control device 200 (see FIG. 2) that controls power supply, and the like, to the actuator 22 from the battery 28 are mounted. The control device 200 supplies power from the battery 28 to the actuator and also controls the joints of the leg portions 30. The control device 200 independently controls each first joint 33 and each second joint 34. Further, a pressure sensor 31A that detects a pressure is provided at a tip portion of the first link portion 31, which comes into contact with the landing surface at the time of landing. Control regarding the body portion 2 by the control device 200 will be described in detail later.

<Controller of Flying Robot 1>

Figure 2:
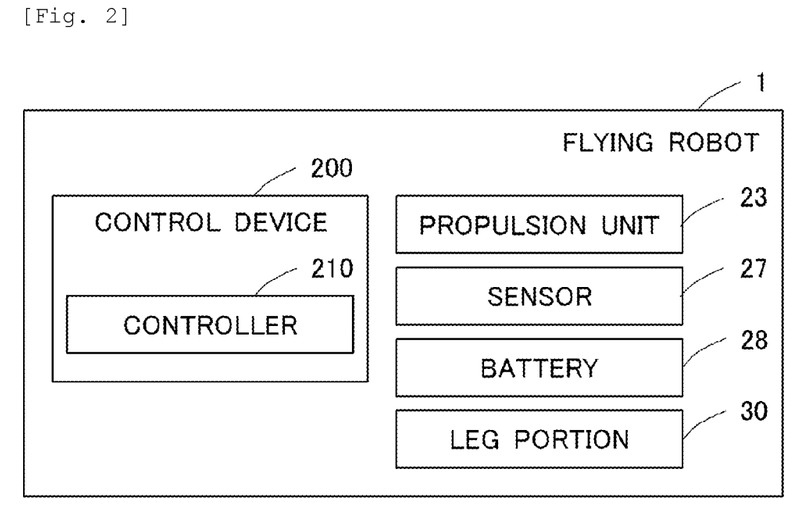
FIG. 2 is an example of a block diagram illustrating respective functional units included in a body portion according to the embodiment.

A control configuration of the body portion 2 provided at the flying robot 1 will be described on the basis of FIG. 2. FIG. 2 is an example of a block diagram illustrating respective functional units included in the body portion 2 according to the present embodiment. The body portion 2 includes the control device 200 for performing flying control regarding flying, landing control regarding landing, and the like. The control device 200, which is a computer including an arithmetic processing unit and a memory, includes a controller 210 as a functional unit. The controller 210 is constituted by a predetermined control program being executed in the control device 200.

The controller 210 is a functional unit that controls the propulsion units 23 so as to generate propulsion force for flying in a case where the body portion 2 flies. The controller 210 controls propulsion force of the four propulsion units 23 on the basis of environmental information which is information related to a flying state of the body portion 2, and the like, and which is detected by a sensor 27. Examples of the environmental information can include information regarding angular velocity of the body portion 2 detected by a gyro sensor corresponding to three axes (a yaw axis, a pitch axis and a roll axis) (not illustrated), a tilt of the body portion 2 detected by an acceleration sensor corresponding to the same three axes (not illustrated). The controller 210 performs feedback control on the tilt of the body portion 2, and the like, so as to achieve a state appropriate for flying by utilizing the environmental information acquired from these sensors. Further, the environmental information may include an azimuth angle which is a direction of the flying body portion in an absolute coordinate system using a direction of an earth's axis as a reference, and the azimuth angle can be detected by an azimuth angle sensor. Note that the sensor 27 is an example of the detection unit.

To move the body portion 2, and the like, back and force and around, the controller 210 decreases rotation speed of the actuator 22 of the propulsion unit 23 in a traveling direction and increases rotation speed of the actuator 22 of the propulsion unit 23 on an opposite side of the traveling direction, which makes the body portion 2, and the like, take a bent-forward posture with respect to the traveling direction, thereby the body portion 2, and the like, travels in a desired direction. Further, to rotationally move the body portion 2, and the like, the controller 210 performs output in a rotation direction of the propeller 21 on the basis of a rotation direction of the body portion 2, and the like. For example, to rotate the body portion 2, and the like, clockwise, the controller 210 decreases output of the actuator 22 corresponding to the propeller 21 that rotates clockwise and increases output of the actuator 22 corresponding to the propeller 21 that rotates counterclockwise.

Further, the controller 210 also serves as a functional unit that executes landing control at the time of landing of the flying robot 1. In the landing control, the controller 210 controls the propulsion units 23 and the leg portions 30. The controller 210 controls the actuators provided at the first joint 33 and the second joint 34 on the basis of detection values of the sensor 27 and the pressure sensor 31A at the time of landing. An encoder (not illustrated) that detects a quantity of state (such as a rotational position and rotation speed of the rotation axis of the actuator) regarding each rotation state is provided at the actuator provided at each joint of the leg portion 30. Further, the controller 210 performs servo control on each actuator of the leg portion 30 so that the rotation angle, and the like, of each joint becomes a state appropriate for landing on the basis of the quantity of state of each actuator detected by the encoder of each actuator.

Figure 3:
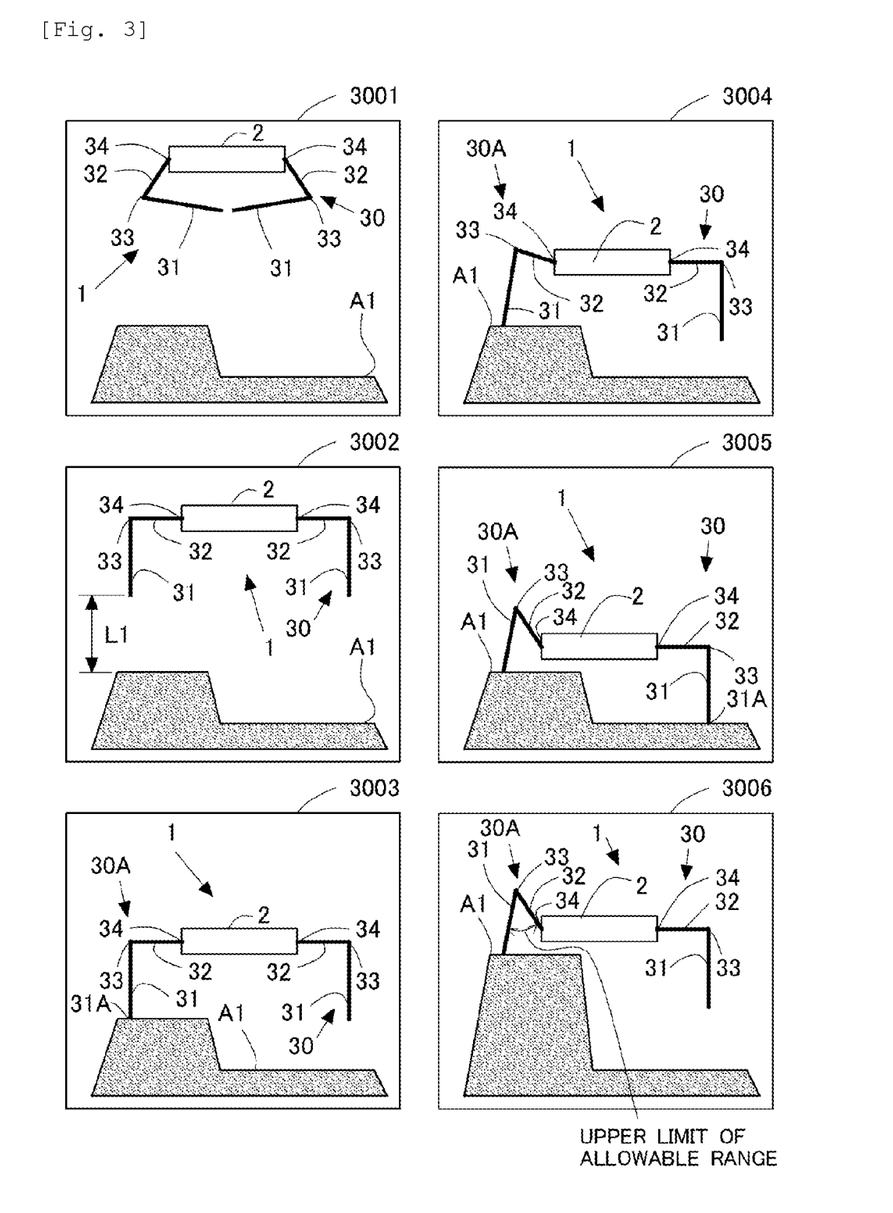
FIG. 3 is a view illustrating a state of leg portions when the flying robot according to the embodiment lands.

Here, a state of the leg portions 30 when the flying robot 1 lands will be described on the basis of FIG. 3. FIG. 3 is a view illustrating the state of the leg portions 30 when the flying robot 1 according to the present embodiment lands. In FIG. 3, part of a structure of the flying robot 1 is omitted. 3001 illustrates a state of the leg portions 30 in a case where the flying robot 1 is in a flying state. In a case of the flying state, for example, the joints of the leg portions 30 are fixed so as to bend the leg portions 30 so that air resistance during movement back and force and around becomes the smallest. For example, the first joint 33 is rotated so that an axial direction of the first link portion 31 comes closer to a horizontal direction and a tip side of the first link portion 31 comes closer to a central axis of the body portion 2. Note that the state of the leg portions 30 in the flying state is not limited to this. For example, the state of the leg portions 30 may be such a state that stabilizes flying of the flying robot 1 in view of center of gravity of the flying robot 1 as well as air resistance.

3002 illustrates a state of the leg portions 30 in a case where the flying robot 1 makes landing approach. For example, in a case where the sensor 27 includes a global navigation satellite system (GNSS) sensor, and if the GNSS sensor detects that the flying robot 1 is located over a destination, the flying robot 1 makes landing approach. In this event, the second joints 34 are moved so that the respective second link portions 32 radially extend in a horizontal direction. Further, the first joints 33 are moved so that tip portions of the first link portions 31 face downward and central axes of the first link portions 31 face a vertical direction. In other words, the respective joint portions are controlled so that the first link portions 31 bend at a right angle with respect to the second link portions 32 and tip portions of the first link portions 31 face downward in the vertical direction. A landing surface A1 has irregularities, and distances L1 between the tip portions of the respective leg portions and the landing surface A1 differ for each leg portion 30. The propulsion force of the propulsion units 23 is controlled from this state to the next state of 3003 to cause the flying robot 1 to descend in the vertical direction.

3003 illustrates a state where the flying robot 1 descends, and one leg portion (first leg portion) comes into contact with the landing surface A1 first. Here, first processing of recognizing the leg portion 30 that comes into contact with the landing surface A1 first among the plurality of leg portions 30 as a first leg portion 10A is executed. The controller 210, for example, recognizes the first leg portion 10A that comes into contact with the landing surface A1 first on the basis of output of the pressure sensor 31A provided at each leg portion 30. The controller 210 causes the flying robot 1 to further descend also after recognizing the first leg portion 10A. According to the first processing, it is possible to recognize the first leg portion 10A whose first joint 33 and second joint 34 are required to be moved thereafter.

3004 illustrates a state where the flying robot 1 is caused to further descend after the first leg portion 10A is recognized. In this event, second processing is executed. The second processing is processing of causing the body portion 2 to further descend to bring another leg portion 30 into contact with the landing surface A1 while moving the first joint 33 and the second joint 34 of the first leg portion 10A while keeping contact between the first leg portion 10A and the landing surface A1 after the first processing. As illustrated in 3004, in the first leg portion 10A, the controller 210 controls the first joint 33 so that an angle formed by the first link portion 31 and the second link portion 32 becomes smaller and controls the second joint 34 so as to move the second link portion 32 obliquely upward from the second joint 34. While the second processing is performed, the controller 210 drives the plurality of propulsion units 23 so as to keep the horizontal state of the body portion 2. In this manner, by moving the first joint 33 and the second joint 34 of the first leg portion 10A in accordance with descent of the body portion 2, the body portion 2 can be caused to descend while the horizontal state of the body portion 2 is kept and while contact between the first leg portion 10A and the landing surface A1 is kept.

3005 illustrates a state where another leg portion 30 comes into contact with the landing surface A1 after the controller 210 recognizes the first leg portion 10A. The controller 210 determines that the other leg portion 30 comes into contact with the landing surface A1 on the basis of output of the pressure sensor 31A provided at the tip portion of each leg portion 30. The first joint 33 and the second joint 34 in the leg portion 30 that comes into contact with the landing surface A1 are moved in accordance with descent of the body portion 2 in a similar manner to the joints of the first leg portion 10A. In this manner, the four leg portions 30 are sequentially brought into contact with the landing surface A1. Also during this time, the body portion 2 continues to descend. In this manner, the plurality of leg portions 30 can be brought into contact with the landing surface A1 while the body portion 2 is kept horizontal.

Then, in a case where all of the four leg portions 30 come into contact with the landing surface A1, the controller 210 executes fourth processing of determining that landing on the landing surface A1 is completed. The controller 210, for example, determines that landing of the flying robot 1 on the landing surface A1 is completed in a case where the output values of the pressure sensors 31A respectively provided at the plurality of leg portions 30 are in a predetermined correlated state. The predetermined correlated state is, for example, a state where the flying robot 1 is balanced and a state where the flying robot 1 is prevented from tilting even if the propulsion force of the propulsion units 23 is stopped. For example, if a sum of pressures detected at the respective pressure sensors 31A reaches a pressure corresponding to mass of the flying robot 1, it may be determined that landing is completed. Note that in this event, a pressure lower than the pressure corresponding to actual mass of the flying robot 1 is detected due to influence of the propulsion force of the propulsion units 23, and thus, the controller 210 performs determination in view of the propulsion force of the propulsion units 23. In a case where it is determined that landing is completed, the controller 210 may stop the propulsion units 23 or may keep the propellers 21 rotating to such an extent that the flying robot 1 does not take off.

3006 illustrates a state where the angle of the first joint 33 reaches an upper limit of an allowable range while the body portion 2 is caused to descend until another leg portion 30 comes into contact with the landing surface A1 after the first leg portion 10A is recognized. The upper limit of the allowable range of the angle of the first joint 33 may be, for example, set at an angle at which the first joint 33 cannot physically bend any more due to a structure of the first joint 33 or a structure of the leg portion 30 and may be set at an angle in which a margin is added to some extent to the angle. Further, as another method, the upper limit of the allowable range of the angle of the first joint 33 may be set at an angle necessary to avoid contact between the leg portion 30 and other portions (for example, the propeller 21). In a case where the angle of the first joint 33 of the first leg portion 10A reaches the upper limit of the allowable range, the body portion 2 cannot be caused to descend any more while the body portion 2 is kept horizontal. Note that this similarly applies to the second joint 34. Such a situation can occur while the body portion 2 descends, and thus, the controller 210 executes third processing of determining whether or not the body portion 2 can continue to descend so that another leg portion 30 comes into contact with the landing surface A1 on the basis of the angle of the first joint 33 or the second joint 34 in the first leg portion 10A while the second processing is performed. For example, in a case where the angle of the first joint 33 of the first leg portion 10A reaches the upper limit of the allowable range, the controller 210 determines that the body portion 2 cannot continue to descend. On the other hand, the controller 210 determines that the body portion 2 can continue to descend until the angle of the first joint 33 of the first leg portion 10A reaches the upper limit of the allowable range.

Then, in a case where it is determined in the third processing that the body portion 2 cannot continue to descend, the controller 210 executes processing of redoing landing. First, the controller 210 adjusts the propulsion force of the propulsion units 23 so as to stop descent of the body portion 2. Then, the controller 210 returns the angle of the first joint 33 in the first leg portion 10A to a state at the time of first contact when the first leg portion 10A comes into contact with the landing surface A1 first while keeping a state where the first leg portion 10A is in contact with the landing surface A1. In this event, the propulsion units 23 cause the body portion 2 to ascend up to a position at the time of the first contact. The position at the time of the first contact is a position illustrated in 3003. In this manner, the propulsion units 23 and the first leg portion 10A are controlled so as to put the body portion 2 into a horizontal state. Here, if the body portion 2 cannot continue to descend in the third processing, there is a possibility that a tilt may occur in the body portion 2. If it is tried to immediately cause the body portion 2 to ascend in this state, the body portion 2 ascends in a tilting state. This leads to a possibility that the flying robot 1 ascends in an oblique direction, and if an obstacle exists near the flying robot 1, there is a possibility that the flying robot 1 may come into contact with the obstacle.

Figure 4:
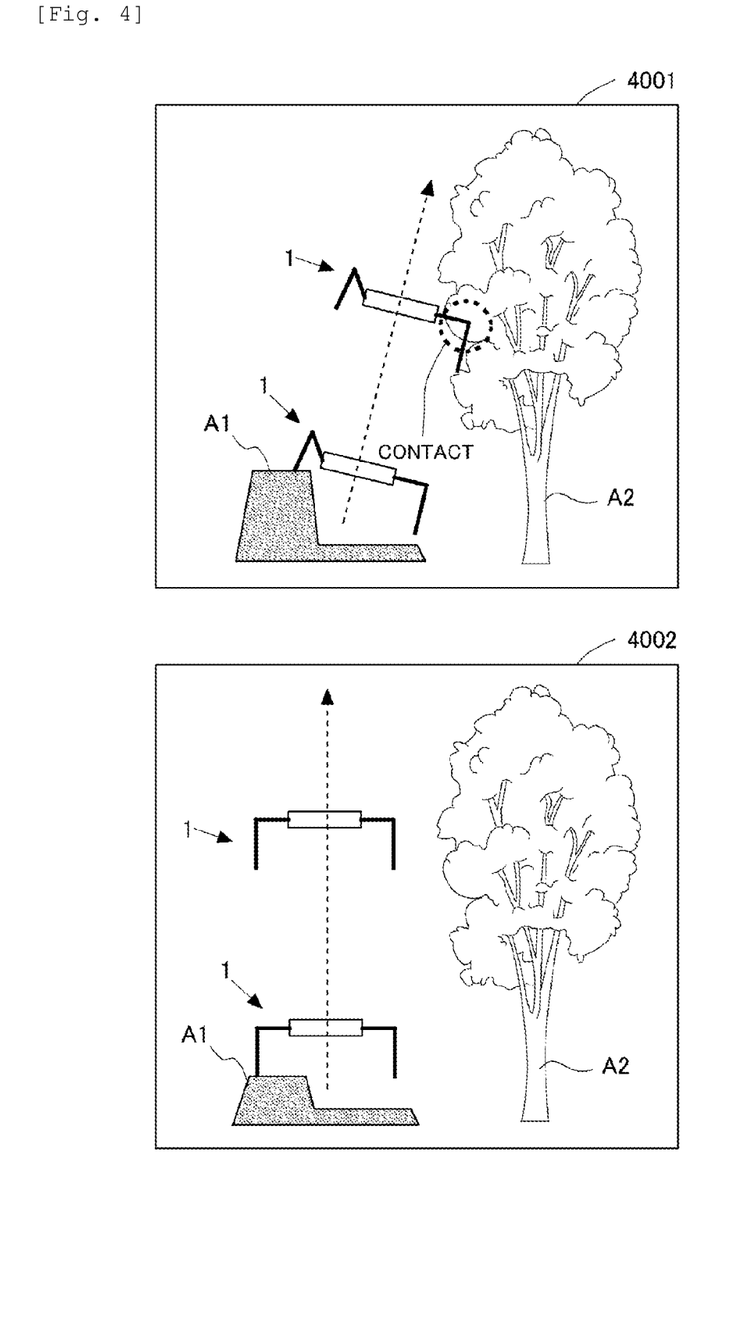
FIG. 4 is a view illustrating an example of a relationship between the flying robot and an obstacle when the flying robot according to the embodiment ascends.

Here, FIG. 4 is a view illustrating an example of a relationship between the flying robot 1 and an obstacle A2 when the flying robot 1 according to the present embodiment ascends. 4001 illustrates a case where the flying robot 1 is caused to ascend up in the air in a state where the body portion 2 is tilted. On the other hand, 4002 illustrates a case where the flying robot 1 is caused to ascend up in the air after the angle of the first joint 33 of the first leg portion 10A is returned to a state at the time of first contact when the first leg portion 10A comes into contact with the landing surface A1 first while the state where the first leg portion 10A is in contact with the landing surface A1 is kept. As illustrated in 4001, if the flying robot 1 ascends up in the air in a state where the body portion 2 is tilted, there is a possibility that the flying robot 1 may come into contact with the obstacle A2. On the other hand, as illustrated in 4002, if the angle of the first joint 33 of the first leg portion 10A is returned to the state at the time of the first contact, the body portion 2 can be returned to the horizontal state, and thus, even if the flying robot 1 ascends thereafter, it is possible to prevent contact with the obstacle A2.

After the state of 3006 transitions to the state of 3003, the controller 210 increases the propulsion force of the propulsion units 23 to cause the flying robot 1 to ascend so that the first leg portion 10A departs from the landing surface A1. Then, after the flying robot 1 ascends up in the air, the controller 210, for example, controls the propulsion units 23 to displace a landing point by a predetermined distance or rotates the body portion on site by a predetermined angle in a yaw direction. In other words, relative positions between the respective leg portions 30 and the landing surface A1 are changed. Then, the state transitions to the state of 3002. The controller 210 then tries landing again.

The plurality of leg portions 30 have a function as legs when landing and a function as legs to walk after landing. The controller 210 also serves as a functional unit that controls actuators provided at the leg portions 30 for walking in a case where the flying robot 1 walks after landing of the flying robot 1 is completed. The controller 210 controls the leg portions 30 on the basis of the environmental information detected by the sensor 27. Further, the controller 210 performs servo control on the actuators of the leg portions 30 so that a tilt, and the like, of the body portion 2 become a state appropriate for walking on the basis of a quantity of state of each actuator detected by the encoder of the actuator provided at each joint of the leg portions 30.

<Landing Control>

Figure 5:
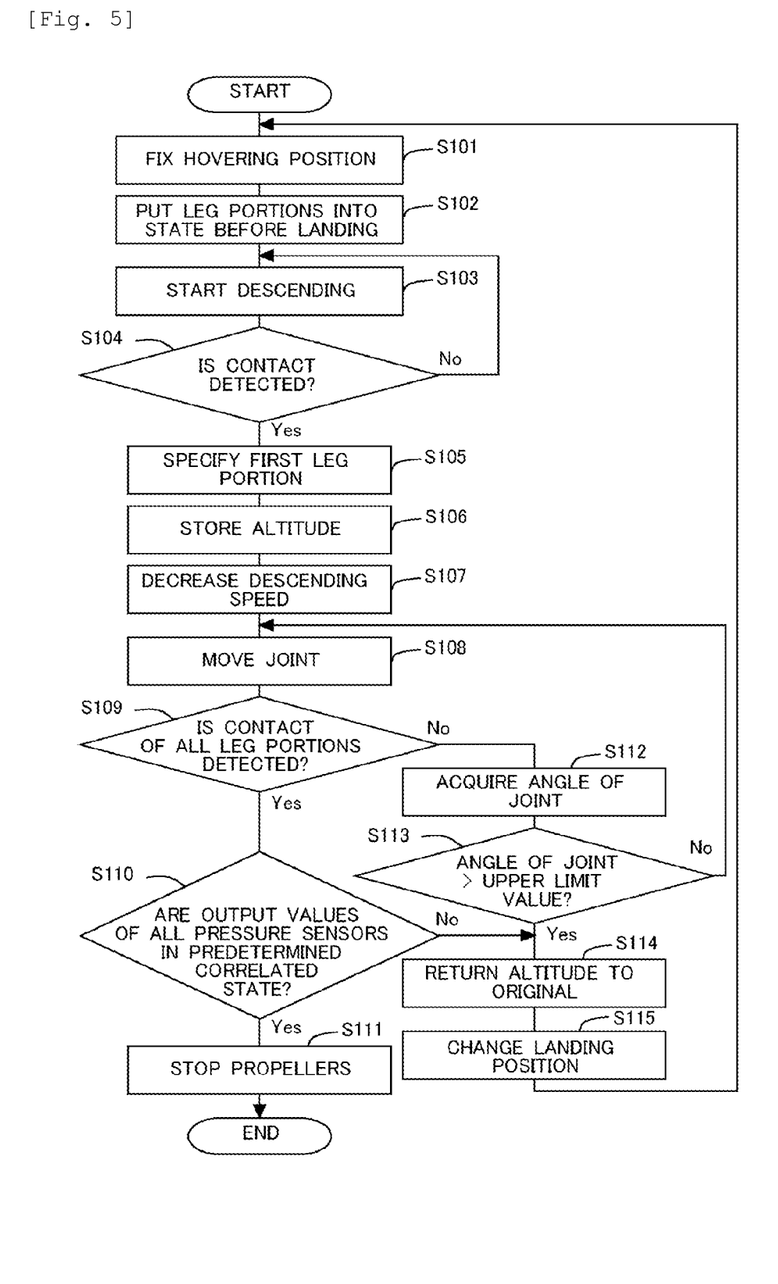
FIG. 5 is an example of a flowchart of landing control according to a first embodiment.

Here, landing control which is control to be executed when the flying robot 1 lands will be described on the basis of FIG. 5. FIG. 5 is an example of a flowchart of landing control according to the first embodiment. The landing control is implemented by a predetermined control program being executed at the body portion 2. Note that it is assumed in the present embodiment that the body portion 2 receives information indicating a point at which the flying robot 1 is to land. Routine illustrated in FIG. 5 is started when the flying robot 1 arrives over a landing point.

In step S101, the controller 210 fixes the position by causing the flying robot 1 to hover over the position at which the flying robot 1 is to land. A state of the flying robot 1 in this event corresponds to the state of 3001 in FIG. 3. The controller 210 controls the propulsion units so that the flying robot 1 hovers over the landing point. Then, in step S102, the controller 210 puts the leg portions 30 into a state before landing. The state before landing is a state of the leg portions 30 corresponding to 3002 in FIG. 3. The controller 210 moves the first joints 33 and the second joints 34 of all the leg portions 30 so that the central axes of the first link portions 31 become the vertical direction, and the central axes of the second link portions 32 become the horizontal direction.

In step S103, the controller 210 causes the body portion 2 to start descending. The controller 210 causes the body portion 2 to descend by decreasing the propulsion force of the propulsion units 23. In this event, the body portion 2 is caused to descend while the propulsion force is controlled so that the state of the body portion 2 becomes closer to the horizontal state. Note that in the present step S103, in a case where the body portion 2 has already been in a descending state, the body portion 2 is caused to continuously descend. In step S104, the controller 210 determines whether or not one of the leg portions 30 comes into contact with the landing surface A1 on the basis of an output value of the pressure sensor 31A. For example, in a case where the output value of the pressure sensor 31A becomes equal to or greater than a landing threshold set in advance, it is determined that the leg portion 30 at which the pressure sensor 31A is provided comes into contact with the landing surface A1. In a case where a positive determination result is obtained in step S104, the processing proceeds to step S105, and in a case where a negative determination result is obtained, the processing returns to step S103, where the body portion 2 is continuously caused to descend. Note that the state of the flying robot 1 when the positive determination result is obtained in step S104 corresponds to the state illustrated in 3003 in FIG. 3.

In step 3105, the controller 210 specifies the first leg portion 10A. The controller 210 specifies the leg portion 30 for which the output value of the pressure sensor 31A becomes equal to or greater than the landing threshold first, as the first leg portion 10A. In step 3106, the controller 210 stores an altitude of the body portion 2 when the first leg portion 10A comes into contact with the landing surface A1. The controller 210 may, for example, store an altitude acquired from an altimeter included in the sensor 27 or may store a distance to the landing surface A1 measured by a radar, and the like, included in the sensor 27. A sensor, and the like, necessary for measurement of an altitude may be provided at the body portion 2 as appropriate.

Then, in step S107, the controller 210 decreases descending speed of the body portion. A posture of the body portion 2 is adjusted by moving the first joint 33 and the second joint 34 thereafter, and thus, to facilitate the adjustment, the descending speed is decreased. This makes it easier to keep the horizontal state of the body portion 2. Further, in step S108, the controller 210 keeps the horizontal state of the body portion 2 by moving the first joint 33 and the second joint 34 of the leg portion 30 that is in contact with the landing surface A1. The state of the flying robot 1 in this event corresponds to the state illustrated in 3004 in FIG. 3. The controller 210 moves the first joints 33 and the second joints 34 of all the leg portions 30 that are in contact with the landing surface A1 in accordance with descent of the body portion 2. The controller 210 may move the first joints 33 and the second joints 34, for example, so that the output value of the pressure sensor 31A becomes equal to or less than a predetermined value. The predetermined value is set at a value at which the body portion 2 is not tilted. Note that as another method, the controller 210 may move the first joints 33 and the second joints 34 in accordance with the altitude of the body portion 2.

In step S109, the controller 210 determines whether or not contact of all the leg portions 30 with the landing surface A1 is detected. For example, in a case where output values of the pressure sensors 31A of all the leg portions 30 become equal to or greater than the landing threshold, the controller 210 determines that contact of all the leg portions 30 with the landing surface A1 is detected. In a case where a positive determination result is obtained in step S109, the processing proceeds to step 3110, and in a case where a negative determination result is obtained, the processing proceeds to step S112. Note that the state of the flying robot 1 when the positive determination result is obtained in step S109 corresponds to the state illustrated in 3005 in FIG. 3. In this event, the controller 210 controls the first joints 33 and the second joints 34 so that the state of the body portion 2 becomes closer to the horizontal state, for example, by utilizing the environmental information detected by the sensor 27 and utilizing inverse kinematics.

In step S110, it is determined whether or not the output values of all the pressure sensors 31A are put into a predetermined correlated state. For example, it is determined whether or not the output values of all the pressure sensors 31A correspond to a value obtained by subtracting predetermined mass from the mass of the flying robot 1. The predetermined mass is an apparent decrease of mass of the flying robot 1 by the propulsion force of the propulsion units 23. In a case where a positive determination result is obtained in step S110, the processing proceeds to step S111, and in a case where a negative determination result is obtained, the processing proceeds to step S114. Then, in step S111, the controller 210 stops the propellers 21, and landing is completed.

On the other hand, in a case where the negative determination result is obtained in step S109, the processing proceeds to step S112, and the controller 210 acquires the angle of the first joint 33 or the second joint 34 of the first leg portion 10A. Note that in the following description, a case where control based on the angle of the first joint 33 of the first leg portion 10A will be described. A case where control based on the angle of the second joint 34 can be considered in a similar manner to the case of the first joint 33. The angle of the first joint 33 is acquired, for example, on the basis of the rotation angle detected by the encoder. Then, in step S113, it is determined whether or not the angle of the first joint 33 becomes greater than an upper limit value. The upper limit value is set as an upper limit value of the range of movement of the first joint 33. Note that an angle at which an angle formed by the first link portion 31 and the second link portion 32 bends from a state of a right angle may be set as the angle of the first joint 33 in this event. In the present step S113, it is only necessary to determine whether or not the first joint 33 cannot move any more. In a case where a positive determination result is obtained in step S113, the processing proceeds to step S114. Note that the state of the flying robot 1 in a case where the positive determination result is obtained in step S113 corresponds to the state illustrated in 3006 in FIG. 3. On the other hand, in a case where a negative determination result is obtained in step S113, the processing proceeds to step S108, and the controller 210 causes the body portion 2 to continuously descend while moving the joints.

In step S114, the controller 210 returns the altitude of the body portion 2 to an original position. The original position described here is a position corresponding to the altitude stored in step S106 and corresponds to a position at the time of the first contact. In the present step S114, the altitude of the body portion 2 is increased to redo landing. However, in this event, the altitude of the body portion 2 is increased while returning the joints of the first leg portion 10A to original positions so as to increase the altitude of the body portion 2 while keeping contact between the first leg portion 10A and the landing surface A1. In this manner, the flying robot 1 is prevented from coming contact with the obstacle A2.

In step S115, the controller 210 causes the body portion 2 to further ascend and further changes the landing position. In this event, the controller 210 dissolves contact between the first leg portion 10A and the landing surface A1. Then, for example, the flying robot 1 is caused to ascend by a predetermined distance, and then, is caused to rotate in a yaw direction by a predetermined angle. Then, the processing returns to step S101, and landing control is redone.

In this manner, according to the flying robot 1 in which the first joint 33 or the second joint 34 is provided at the leg portion 30, when the flying robot 1 lands on an irregular ground, or the like, by moving the first joint 33 or the second joint 34 for each leg portion 30, it is possible to keep the body portion 2 in a horizontal state. The flying robot 1 can therefore land on an irregular ground, or the like, while the flying robot 1 is prevented from losing balance. Further, in a case where the angle of the joint of the first leg portion 10A reaches the upper limit of the allowable range after the first leg portion 10A comes into contact with the landing surface A1, by redoing landing, it is possible to prevent the flying robot 1 from losing balance. Further, when landing is redone, by causing the body portion 2 to ascend to an altitude at which the first leg portion 10A comes into contact with the landing surface A1 and moving the joint so as to keep contact between the first leg portion 10A and the landing surface A1 in this event, it is possible to prevent the flying robot 1 from coming into contact with the obstacle A2.

<Modification of First Embodiment>

In the first embodiment, the joint of the leg portion 30 that comes into contact with the landing surface A1 is moved. In other words, the joint is not moved in each leg portion 30 until the leg portion 30 comes into contact with the landing surface A1. On the other hand, as another method, after the first leg portion 10A comes into contact with the landing surface A1, joints of other leg portions 30 may be moved. In this event, the first joint 33 or the second joint 34 may be moved so that the first link portion 31 moves downward. For example, the first joint 33 and the second joint 34 may be moved so that the central axis of the first link portion 31 faces in the vertical direction. Here, when the first leg portion 10A comes into contact with the landing surface A1, the landing surface A1 under another leg portion 30 is often located near the other leg portion 30. In such a case, by moving the first joint 33 and the second joint 34 so that the other leg portion 30 moves downward, the other leg portion 30 can be brought into contact with the landing surface A1 early. This, for example, makes it easier to keep balance of the flying robot 1. Further, it is possible to reduce a period required for landing of the flying robot 1.

Figure 6:
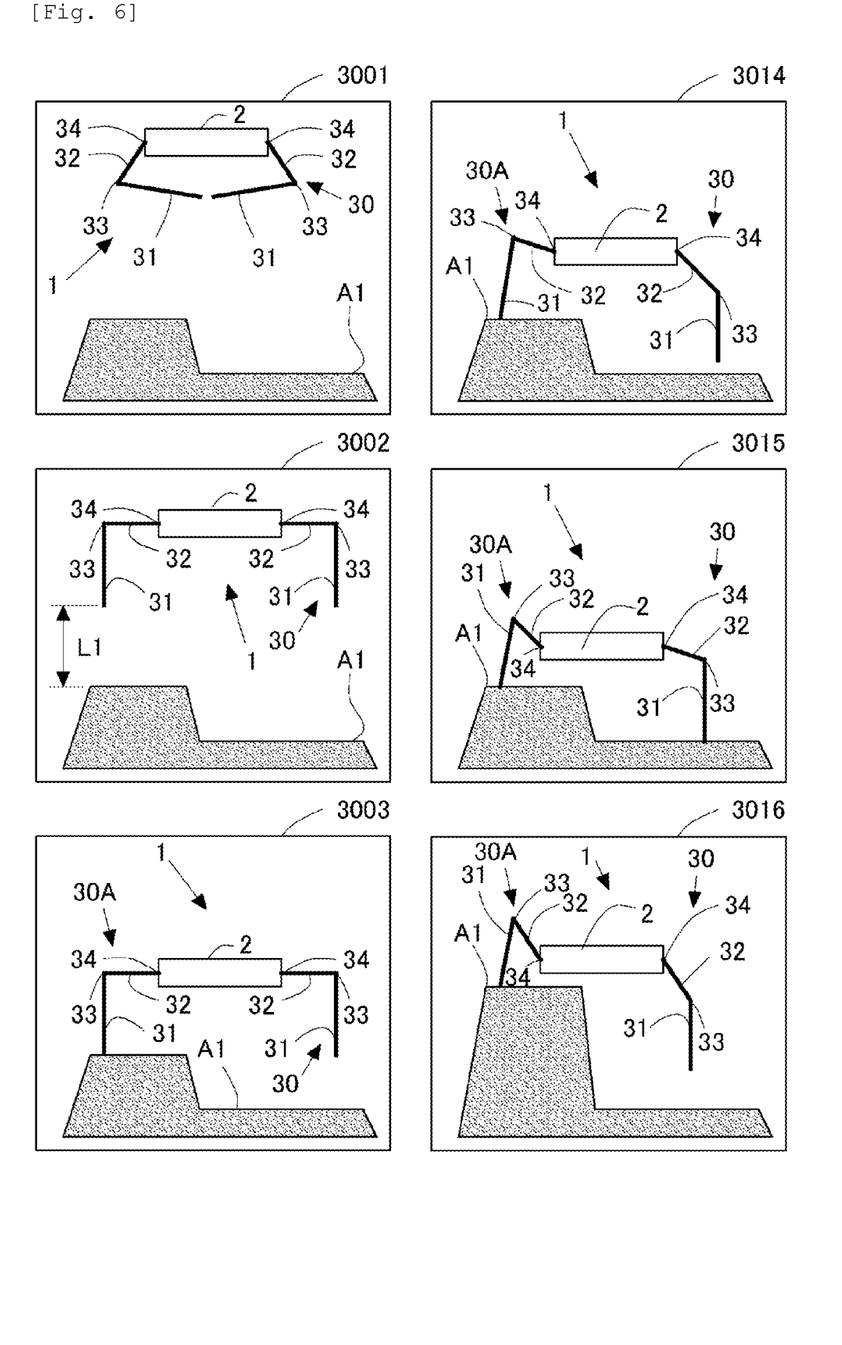
FIG. 6 is a view illustrating a state of leg portions when a flying robot according to a modification of the first embodiment lands.

Here, landing control in a modification of the present embodiment will be described using FIG. 6. FIG. 6 is a view illustrating a state of the leg portions 30 when the flying robot 1 according to the present modification lands. 3001, 3002 and 3003 are the same as those in FIG. 3, and thus, description will be omitted. 3014 illustrates a state where the flying robot 1 further descends after the first leg portion 10A is recognized. In this event, the first joint 33 and the second joint 34 are moved so that another leg portion 30 other than the leg portion 30 that is in contact with the landing surface A1 comes closer to a direction of the landing surface A1. In other words, the joints are moved so that the other leg portion 30 moves in a direction of the landing surface A1 relatively with respect to the body 25 while the body portion 2 is caused to descend. As illustrated in 3014, the first joint 33 of the other leg portion 30 is moved so that angle formed by the first link portion 31 and the second link portion 32 becomes greater than 90 degrees, and the second joint 34 is moved so that the second link portion 32 rotates downward centering around the second joint 34. In this event, the first joint 33 and the second joint 34 are moved so that the central axis of the first link portion 31 faces in the vertical direction. Also during this time, the controller 210 controls the plurality of propulsion units 23 and the joint of the leg portion 30 that is grounded so that the state of the body portion 2 comes closer to the horizontal state. In this manner, by moving the other leg portion 30 downward while keeping the horizontal state, it is possible to accelerate contact with the landing surface A1.

3015 illustrates a state where the other leg portion 30 comes into contact with the landing surface A1 after the first leg portion 10A is recognized. The controller 210 determines that the other leg portion 30 comes into contact with the landing surface A1 also on the basis of output of the pressure sensor 31A provided at the tip portion of each leg portion 30. Note that it is assumed in 3015 that all of the four leg portions 30 are in contact with the landing surface A1. In this case, the controller 210 determines that landing on the landing surface A1 is completed. A method for determining landing is the same as the state of 3005 described above.

Note that the joints of the other leg portion 30 may be moved while the body portion 2 is caused to descend until all of the leg portions 30 come into contact with the landing surface A1. In other words, the body portion 2 may be caused to descend while the first joint 33 and the second joint 34 of the leg portion 30 that is in contact with the landing surface A1 are moved and while the first joints 33 and the second joints 34 of the other leg portion 30 are moved so as to move the other leg portions 30 that are not in contact with the landing surface A1 downward. In this manner, by causing the plurality of leg portions 30 to sequentially come into contact with the landing surface A1, it is possible to achieve landing with the plurality of leg portions 30 while keeping the body portion 2 horizontal.

3016 illustrates a state where the angle of the first joint 33 reaches the upper limit of the allowable range and the angles of the first joint 33 and the second joint 34 of another leg portion 30 reach the upper limit of the range of the movement after the first leg portion 10A is recognized and while the body portion 2 is caused to descend until the other leg portion 30 comes into contact with the landing surface A1. In the example in 3016, the angle of the first joint 33 of the first leg portion 10A reaches an upper limit in a bending direction of the allowable range, and the angle of the first joint 33 of the other leg portion 30 reaches an upper limit in an extension direction of the allowable range. In a case where the angles of the joints of each leg portion 30 reach the upper limit of the allowable range, the body portion 2 cannot be caused to descend any more while the body portion 2 is kept horizontal, and the other leg portion 30 cannot be moved downward. Such a situation can occur while the body portion 2 descends, and thus, the controller 210 determines whether or not the body portion 2 can continue to descend so that the other leg portion 30 comes into contact with the landing surface A1 on the basis of the angle of the first joint 33 or the second joint 34 of the first leg portion 10A while the body portion 2 descends and the angle of the first joint 33 or the second joint 34 of the other leg portion 30. For example, in a case where the angle of the first joint 33 of the first leg portion 10A reaches the upper limit of the allowable range and the angle of the first joint 33 of the other leg portion 30 reaches the upper limit of the allowable range, the controller 210 determines that the body portion 2 cannot continue to descend. On the other hand, the controller 210 determines that the body portion 2 can continue to descend until the angle of the first joint 33 of the first leg portion 10A and the angle of the first joint 33 of the other leg portion 30 reaches the upper limit of the allowable range. In the modification, the other leg portion 30 is moved downward, and thus, even in a case where a difference in level of the landing surface A1 is larger than that in the first embodiment described above, the flying robot 1 can land.

Further, in a case where it is determined that the body portion 2 cannot continue to descend, the controller 210 executes processing of redoing landing. First, the controller 210 adjusts the propulsion force of the propulsion units 23 so as to stop descent of the body portion 2. Then, the controller 210 returns the angle of the first joint 33 of the first leg portion 10A to the state at the time of the first contact when the first leg portion 10A comes into contact with the landing surface A1 first while keeping the state where the first leg portion 10A is in contact with the landing surface A1. In this event, the propulsion units 23 cause the body portion 2 to ascend to a position at the time of the first contact. Further, in this event, the angles of the first joint 33 and the second joint 34 of the other leg portion 30 are also returned to the state at the time of the first contact when the first leg portion 10A comes into contact with the landing surface A1 first. The controller 210 causes the body portion 2 to ascend upward in the vertical direction while keeping the body portion 2 horizontal so that the tip portion of the first leg portion 10A departs from the landing surface A1 after the flying robot 1 returns to the state at the time of the first contact.

Landing control in the present modification will be described on the basis of FIG. 5 described above. In step S108 in FIG. 5, the controller 210 also moves the joints of the other leg portion 30 while moving the joint of the first leg portion 10A. Further, in step S112, the controller 210 acquires the angles of the joints of the other leg portion 30 in addition to the angle of the joint of the first leg portion 10A and determines whether or not the angle of each joint exceeds the upper limit in step S113.

As described above, according to the present modification, it is possible to achieve landing on the landing surface A1 with a larger difference in level.

Second Embodiment

While in the first embodiment, contact between the leg portion 30 and the landing surface A1 is determined on the basis of the output value of the pressure sensor 31A provided at the leg portion 30, instead of this, in the present second embodiment, it is determined that the leg portion 30 comes into contact with the landing surface A1 in a case where a tilt of the body portion 2 of the flying robot 1 is detected. It is therefore not necessary to provide the pressure sensor 31A at the leg portion 30 in the present second embodiment. The tilt of the body portion of the flying robot 1 is detected by a gyro sensor or an acceleration sensor included in the sensor 27. Here, if the flying robot 1 reduces its altitude to land on an irregular ground, the body portion 2 tilts centering around a tip portion of the leg portion 30 that comes into contact with the landing surface A1 first. It can be therefore determined that the leg portion 30 comes into contact with the landing surface A1 from the fact that the body portion 2 tilts. Further, a direction in which the body portion 2 tilts is different in accordance with the leg portion 30 that comes into contact with the landing surface A1, so that it is possible to specify the leg portion 30 that comes into contact with the landing surface A1 on the basis of the direction in which the body portion 2 tilts.

In the present embodiment, in a case where the tilt of the body portion 2 is detected, the leg portion 30 that is in contact with the landing surface A1 is specified in accordance with the tilt of the body portion 2, and the first joint 33 or the second joint 34 of the leg portion 30 is moved so that the state of the body portion 2 becomes closer to the horizontal state. Also after the first leg portion 10A is specified, the body portion is caused to further descend, and the first joint 33 and the second joint 34 of the first leg portion 10A are moved so that the state of the body portion 2 becomes closer to the horizontal state. Then, in a process of causing the body portion 2 to descend, for example, in a case where the horizontal state of the body portion 2 cannot be kept only by moving the joint of the first leg portion 10A, it is determined that another leg portion 30 comes into contact with the landing surface A1. Also in this event, the other leg portion 30 that comes into contact with the landing surface A1 is specified on the basis of a direction in which the body portion 2 tilts. In this manner, the leg portion 30 that comes into contact with the landing surface A1 is specified while the tilt of the body portion 2 is corrected, and if it is determined that all of the leg portions 30 are grounded on the landing surface A1, landing of the flying robot 1 is completed.

Landing control in the present embodiment will be described next using FIG. 3 described above. 3001 and 3002 are the same as those in the first embodiment, and thus, description will be omitted. In the present embodiment, in the state illustrated in 3003, the controller 210 recognizes that the leg portion 30 comes into contact with the landing surface A1, for example, in a case where the tilt of the body portion 2 detected by the sensor 27 exceeds a threshold. Further, the first leg portion 10A is recognized on the basis of a direction in which the body portion 2 tilts. For example, the leg portion 30 located on an upper side of the tilt of the body portion 2 is recognized as the first leg portion 10A. The controller 210 causes the flying robot 1 to further descend also after the first leg portion 10A is recognized.

Further, in the state illustrated in 3004, that is, in a state where the flying robot 1 is caused to further descend after the first leg portion 10A is recognized, processing of bringing another leg portion 30 into contact with the landing surface A1 by causing the body portion 2 to further descend while moving the first joint 33 and the second joint 34 of the first leg portion 10A so as to keep contact between the first leg portion 10A and the landing surface A1, is executed. This processing includes processing of detecting the tilt of the body portion 2 by the sensor 27 and moving the first joint 33 or the second joint 34 of the first leg portion 10A so as to make the tilt of the body portion 2 smaller. Further, the controller 210 drives the plurality of propulsion units 23 so as to keep the body portion 2 in a horizontal state. In this manner, the controller 210 causes the body portion 2 to descend while controlling the joints and the propulsion units 23 so as to keep the body portion 2 in a horizontal state.

In the state illustrated in 3005, that is, in a state where another leg portion 30 is in contact with the landing surface A1, the controller 210 determines that the other leg portion 30 also comes into contact with the landing surface A1 on the basis of the tilt of the body portion 2 detected by the sensor 27. For example, in a case where a tilt occurs in the body portion 2 even if the joints and the propulsion units 23 are controlled so that the state of the body portion 2 becomes a horizontal state, it is determined that the other leg portion 30 comes into contact with the landing surface A1. Further, the other leg portion 30 that comes into contact with the landing surface A1 is specified on the basis of a direction in which the body portion 2 tilts in this event. Further, the body portion 2 is caused to descend while the joints of the leg portions 30 that are in contact with the landing surface A1 so as to keep the horizontal state of the body portion 2 until all of the leg portions 30 come into contact with the landing surface A1. Further, the controller 210, for example, determines that landing is possible in a case where all of the leg portions 30 are in contact with the landing surface A1 and the body portion 2 is in a horizontal state and stops rotation of the propellers 21.

On the other hand, in the state illustrated in 3006, that is, in a state where the angle of the first joint 33 reaches the upper limit of the allowable range while the body portion 2 is caused to descend until the other leg portion 30 comes into contact with the landing surface A1, the controller 210 returns the flying robot 1 to the state at the time of the first contact and redoes landing in a similar manner to the first embodiment.

<Landing Control>

Figure 7:
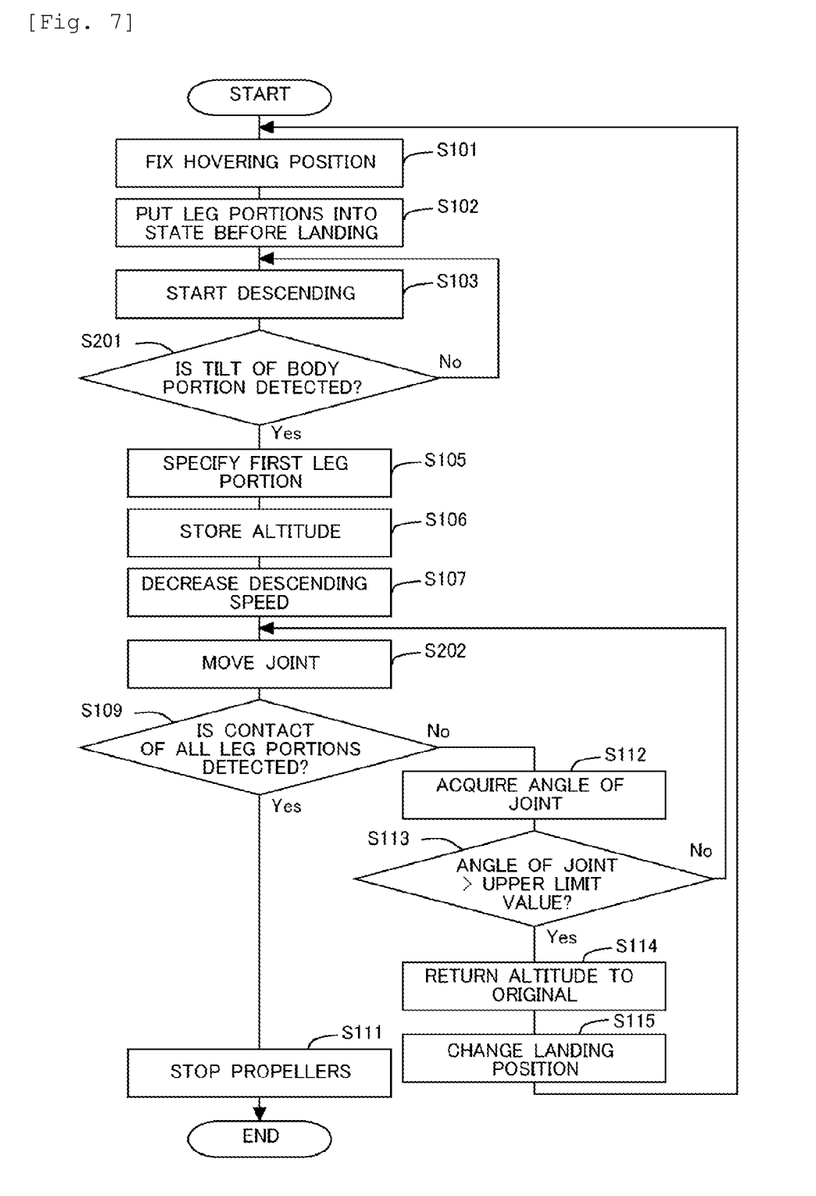
FIG. 7 is an example of a flowchart of landing control according to a second embodiment.

Here, landing control which is control to be executed when the flying robot 1 lands will be described on the basis of FIG. 7. FIG. 7 is an example of a flowchart of landing control according to the second embodiment. The landing control is implemented by a predetermined control program being executed at the body portion 2. Note that it is assumed in the present embodiment that the body portion 2 receives information indicating a point at which the flying robot 1 is to land. Routine illustrated in FIG. 7 is started when the flying robot 1 arrives over a landing point. The same reference numerals will be assigned to steps in which processing that is the same as the processing in the routine illustrated in FIG. 5 is executed, and description will be omitted.

In the flowchart illustrated in FIG. 7, if the processing in step S103 is finished, the processing proceeds to step 3201. In step S201, the controller 210 determines whether or not a tilt of the body portion 2 is detected. For example, the controller 210 determines whether or not the tilt of the body portion 2 detected by the sensor 27 exceeds a threshold. The threshold is a tilt when the leg portion 30 comes into contact with the landing surface A1. This threshold is a value greater than that in a case where the body portion 2 tilts by the influence of wind, and the like. In a case where a positive determination result is obtained in step S201, the processing proceeds to step S105, and in a case where a negative determination result is obtained, the processing returns to step S103. Note that a state of the flying robot 1 in a case where the negative determination result is obtained in step S201 corresponds to the state illustrated in 3003 in FIG. 3.

Further, in the flowchart illustrated in FIG. 7, in a case where the processing in step S107 is completed or in a case where the negative determination result is obtained in step 3113, the processing proceeds to step S202. In step S202, the controller 210 moves the first joint 33 and the second joint 34 of the leg portion 30 that is in contact with the landing surface A1 to keep the horizontal state of the body portion 2. A state of the flying robot 1 in this event corresponds to the state illustrated in 3004 in FIG. 3. For example, in a case where a tilt of the body portion 2 is detected by the sensor 27, the controller 210 moves the first joint 33 and the second joint 34 so as to dissolve the tilt. In this event, feedback control may be performed. If the processing in step S202 is executed, the controller 210 moves the joints of the leg portion 30 so as to keep the horizontal state of the body portion 2 also in the subsequent processing.

Further, in the flowchart illustrated in FIG. 7, in a case where a positive determination result is obtained in step S109, the processing proceeds to step S111, and the controller 210 stops the propellers. Note that in a process of stopping the propellers 21, in a case where a tilt occurs in the body portion 2, the state of the body portion 2 may be made closer to the horizontal state by moving the joints. Further, in a case where the state of the body portion 2 cannot be made closer to the horizontal state in a process of decreasing rotation speed of the propellers 21, the processing may proceed to step S114, and the controller 210 may redo landing.

In this manner, by moving the first joint 33 or the second joint 34 in accordance with a detection value of a sensor that detects a tilt of the body portion 2, the state of the body portion 2 can be kept in the horizontal state. It is therefore possible to achieve landing on an irregular ground, or the like, while preventing the flying robot 1 from losing balance.

Note that as in the modification of the first embodiment, each joint may be moved so that another leg portion 30 moves downward after the first leg portion 10A comes into contact with the landing surface A1. This makes it possible to achieve landing on the landing surface A1 with a larger difference in level.

DESCRIPTION OF THE REFERENCE NUMERALS AND SYMBOLS 1 flying robot
2 body portion
30 leg portion
31 first link portion
32 second link portion
33 first joint
34 second joint
210 controller

The invention claimed is:

1. A flying robot comprising:
a body portion;
a propulsion portion including a plurality of propulsion units configured to generate propulsion force by driving rotor blades, wherein the plurality of propulsion units are provided at the body portion;
a plurality of leg portions configured to support the body portion, wherein each leg portion of the plurality of leg portions includes at least one joint and is configured to be able to change a posture of the leg portion; and
a controller configured to control the plurality of leg portions when landing on a landing surface from a flying state,
wherein each leg portion of the plurality of leg portions includes a first link portion and a second link portion provided closer to the body than the first link portion,
the joint includes a first joint that rotatably connects the first link portion and the second link portion, and a second joint that rotatably connects the second link portion and the body,
wherein the controller controls part or all of at least one leg portion among the plurality of leg portions to adjust a tilt of the body portion from when the at least one leg portion comes into contact with the landing surface until when landing on the landing surface is completed,
wherein the controller executes:
first processing of recognizing, as a first leg portion, a leg portion that comes into contact with the landing surface first among the plurality of leg portions in a process of causing the body portion to descend by the propulsion portion for landing on the landing surface from the flying state; and
second processing of causing the body portion to further descend after the first processing to bring another leg portion into contact with the landing surface while moving the first joint and the second joint of the first leg portion while keeping contact between the first leg portion and the landing surface after the first processing such that an angle of the first joint and the second joint of the first leg portion changes as the body portion descend,
in the second processing, the controller configured to control the first joint of the first leg portion such that the angle formed by the first link portion and the second link portion becomes smaller as the body portion descends and control the second joint of the first leg portion such that the second link portion moves obliquely upward from the second joint as the body portion descends, and
in the second processing, the controller configured to individually change propulsion force of the plurality of propulsion units while moving the first joint and the second joint to maintain the body portion in a horizontal state.

2. The flying robot according to claim 1,
wherein the controller causes the body portion to descend while moving the first joint and the second joint of an other leg portion that comes into contact with the landing surface while keeping contact between the other leg portion and the landing surface in the second processing.

3. The flying robot according to claim 1,
wherein the controller further executes third processing of determining whether or not the body portion can continue to descend so that the other leg portion comes into contact with the landing surface on a basis of the angle of the first joint and the second joint of the first leg portion while the second processing is performed,
wherein the controller further determines whether or not the body portion can continue to descend by determining whether the angle of the first joint or the second joint of the first leg portion reaches an upper limit of an allowable range of the angle of the first joint or the second joint.

4. The flying robot according to claim 3,
wherein when the controller determines in the third processing that the angle of the first joint or the second joint of the first leg portion has reached the upper limit of the allowable range of the angle of the first joint or the second joint, the propulsion portion causes the body portion to ascend up to return to a position at a time when the first leg portion first comes into contact with the landing surface while the controller returns the angle of the first joint and the second joint of the first leg portion to an angle at the time when the first leg portion first comes into contact with the landing surface while keeping contact between the first leg portion and the landing surface to maintain the body portion in the horizontal state.

5. The flying robot according to claim 1,
wherein a pressure sensor capable of detecting a pressure when each leg portion of the plurality of leg portions comes into contact with the landing surface is provided at a tip of the leg portion,
the controller recognizes the first leg portion on a basis of whether or not there is output regarding contact from the pressure sensor provided at the first leg portion in the first processing, and
the controller further executes fourth processing of determining that landing of the flying robot on the landing surface is completed when output values of the pressure sensors respectively provided at the plurality of leg portions are in a predetermined correlated state.

6. The flying robot according to claim 1, further comprising:
a detection unit that detects a tilt of the body portion,
wherein the controller controls the at least one leg portion to make the body portion closer to a horizontal state if a tilt from the horizontal state of the body portion is detected by the detection unit when the leg portion comes into contact with the landing surface in a state where the plurality of leg portions take a predetermined posture.

7. The flying robot according to claim 6,
wherein the controller causes the body portion to descend while moving the first joint and the second joint of the leg portion that comes into contact with the landing surface while keeping contact between the leg portion and the landing surface.

8. The flying robot according to claim 6,
wherein the controller further determines whether or not the body portion can continue to descend on a basis of the angle of the first joint and the second joint of the leg portion,
wherein the controller further determines whether or not the body portion can continue to descend by determining whether the angle of the first joint or the second joint of the first leg portion reaches an upper limit of an allowable range of the angle of the first joint or the second joint.

9. The flying robot according to claim 8,
wherein when the controller determines that the angle of the first joint or the second joint of the first leg portion has reached the upper limit of the allowable range of the angle of the first joint or the second joint, the propulsion portion causes the body portion to ascend up to return to a position at a time when a first leg portion first comes into contact with the landing surface, wherein the first leg portion is a leg portion that comes into contact with the landing surface first among the plurality of leg portions, while the controller returns an angle of the first joint and the second joint of the first leg portion to an angle at the time when the first leg portion first comes into contact with the landing surface while keeping contact between the first leg portion and the landing surface to maintain the body portion in the horizontal state.

10. The flying robot according to claim 1,
wherein the plurality of leg portions also serve as a plurality of leg portions that cause the flying robot to walk after landing on the landing surface is completed.

11. A flying robot comprising:
a body portion;
a propulsion portion including a plurality of propulsion units configured to generate propulsion force by driving rotor blades, wherein the plurality of propulsion units are provided at the body portion;
a plurality of leg portions configured to support the body portion, wherein each leg portion of the plurality of leg portions includes at least one joint and is configured to be able to change a posture of the leg portion; and
a controller configured to control the plurality of leg portions when landing on a landing surface from a flying state,
wherein each leg portion of the plurality of leg portions includes a first link portion and a second link portion provided closer to the body than the first link portion,
the joint includes a first joint that rotatably connects the first link portion and the second link portion, and a second joint that rotatably connects the second link portion and the body,
wherein the controller controls part or all of at least one leg portion among the plurality of leg portions to adjust a tilt of the body portion from when the at least one leg portion comes into contact with the landing surface until when landing on the landing surface is completed,
wherein the controller executes:
first processing of recognizing, as a first leg portion, a leg portion that comes into contact with the landing surface first among the plurality of leg portions in a process of causing the body portion to descend by the propulsion portion for landing on the landing surface from the flying state; and
second processing of causing the body portion to further descend after the first processing to bring another leg portion into contact with the landing surface while moving the first joint and the second joint of the first leg portion while keeping contact between the first leg portion and the landing surface after the first processing such that an angle of the first joint and the second joint of the first leg portion changes as the body portion descend,
in the second processing, the controller configured to individually change propulsion force of the plurality of propulsion units while moving the first joint and the second joint to maintain the body portion in a horizontal state, and
the controller decreases descending speed of the body portion in the second processing lower than descending speed of the body portion before start of execution of the second processing.

* * * * *